US012798773B2

(12) United States Patent
Flashaar et al.

(10) Patent No.: US 12,798,773 B2
(45) Date of Patent: Nov. 17, 2026

(54) GALLEY WATER HEATING SYSTEM FOR HEATING THE WATER OF A WATER SUPPLY SYSTEM OF AN AIRCRAFT GALLEY AND AIRCRAFT WITH SUCH AN AIRCRAFT GALLEY

(71) Applicant: Airbus Operations GmbH, Hamburg (DE)

(72) Inventors: Sebastian Flashaar, Hamburg (DE); Boris Holtorf, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 394 days.

(21) Appl. No.: 18/533,686

(22) Filed: Dec. 8, 2023

(65) Prior Publication Data

US 2024/0190572 A1 Jun. 13, 2024

(30) Foreign Application Priority Data

Dec. 12, 2022 (EP) .................................... 22212851

(51) Int. Cl.
*B64D 11/02* (2006.01)
*B64D 11/04* (2006.01)
*B64D 13/06* (2006.01)
*B64D 13/08* (2006.01)

(52) U.S. Cl.
CPC .............. *B64D 11/04* (2013.01); *B64D 11/02* (2013.01); *B64D 13/06* (2013.01); *B64D 13/08* (2013.01)

(58) Field of Classification Search
CPC ........ B64D 11/02; B64D 13/06; B64D 13/08; B64D 11/04; B64D 2013/0618
See application file for complete search history.

(56) References Cited

U.S. PATENT DOCUMENTS 11,231,204 B2 1/2022 Burd
2008/0087039 A1* 4/2008 Reed ...................... B64D 13/06 62/498
2016/0096628 A1 4/2016 Vue
2018/0338666 A1 11/2018 Seewang

FOREIGN PATENT DOCUMENTS

WO 2008112029 A1 9/2008

OTHER PUBLICATIONS

European Search Report for Application No. 22212851 dated Apr. 24, 2023.

* cited by examiner

*Primary Examiner* — Alfred Basichas
(74) *Attorney, Agent, or Firm* — KDW Firm PLLC

(57) ABSTRACT

A galley water heating system for heating water of a water supply system of an aircraft galley includes a galley water supply system including water bearing parts, and a fresh air piping system having an air inlet at one end of the fresh air piping system, a first air outlet for supplying fresh air to an aircraft cabin, wherein the first air outlet is at another end of the fresh air piping system, and a second air outlet located in relation to the galley water supply system such that fresh air flows at least in sections against predetermined water bearing parts of the galley water supply system. An aircraft galley is disclosed and an aircraft with such an aircraft galley.

15 Claims, 2 Drawing Sheets

GALLEY WATER HEATING SYSTEM FOR HEATING THE WATER OF A WATER SUPPLY SYSTEM OF AN AIRCRAFT GALLEY AND AIRCRAFT WITH SUCH AN AIRCRAFT GALLEY

TECHNICAL FIELD

The disclosure herein relates to a galley water heating system for heating the water of a water supply system of an aircraft galley. The disclosure herein is furthermore concerned with an aircraft galley as well as an aircraft containing such a galley water heating system.

BACKGROUND

Airplanes, in particular passenger airplanes, usually contain galleys for providing food and drinks during the flight. The temperatures behind and outboard of the galley can be down to −20° C. and inside a compartment of the galley down to −4° C. Hence, the tubing of galley water systems which is mainly arranged behind and outboard of the galley is in a cold area.

In case no water is drawn inside the galley for a longer time the water inside this tubing of the galley water system can cool down until negative temperatures are reached and ice crystals could appear on the insides of the tubes. When finally water is drawn then these ice particles will be transported through the tubing, for example to the water filter, and seem to block it.

Typically, galley water systems in such galleys are heated electrically to prevent the water in the galley water system from freezing. However, electric heating systems need electrical power and increase the weight of the airplane.

SUMMARY

Aspects of the disclosure herein may provide solutions for improving the heating of galley water systems during flight.

According to the disclosure herein, this problem is solved in each case by the subject matter disclosed herein.

According to a first aspect of the disclosure herein, a galley water heating system for heating the water of a water supply system of an aircraft galley is provided. The galley water heating system comprises a galley water supply system which comprises water bearing parts. Furthermore, the galley water heating system comprises a fresh air piping system comprising: an air inlet located at one end of the fresh air piping system; a first air outlet for supplying fresh air to an aircraft cabin, wherein the first air outlet is located at another end of the fresh air piping system; and a second air outlet being located in relation to the galley water supply system such that fresh air flows at least in sections against predetermined water bearing parts of the galley water supply system.

According to a second aspect of the disclosure herein, an aircraft galley comprising a galley water heating system according to the disclosure herein is provided, wherein the fresh air supplied by the second air outlet provides a thermal energy to the predetermined water bearing parts of the galley water supply system by thermal convection on a surface of the galley water supply system.

According to a third aspect of the disclosure herein, an aircraft comprising an aircraft galley according to the disclosure herein is provided.

A fundamental concept of the disclosure herein is to use and adapt the existing fresh air (piping) system for heating the water of the water supply system. The existing fresh air (piping) system is integrated in the aircraft galley for supplying fresh air to the first air outlet in the galley work area, similar to the fresh air nozzles above the passenger seats. The fresh air (piping) system can be connected by the air inlet to the aircraft fresh air supply system providing fresh air for use in the aircraft. The temperature of the fresh air provided by the aircraft fresh air supply system is about 20° C. As the temperatures behind and outboard of the galley can be up to −20° C. and inside a compartment of the galley up to −4° C., any temperature higher than 0° C. will increase the temperature above the freezing temperature of water. The fresh air having a temperature of about 20° C. flows against the predetermined water bearing parts of the galley water supply system, wherein heat is exchanged/transferred from the fresh air to the water bearing parts and further to the water inside the water bearing parts.

A particular advantage in the solution according to an aspect of the disclosure herein is that the overall risk of freezing inside the galley water supply system can be reduced. Furthermore, electrical heating systems for heating the galley water supply system can be omitted. Thus, the weight and/or the power consumption of the aircraft can be reduced.

Advantageous embodiments and further developments emerge from the description with reference to the figures.

According to some aspects of the galley water heating system according to the disclosure herein, the predetermined water bearing parts are configured as a water filter of the galley water supply system. Thus, ice particles, which could appear on the insides of the water filter when the galley water supply system cools down to negative temperatures, can be reduced in the water filter. The ice particles might block the water filter and disturb a proper functionality of the water filter. Additionally or alternatively, the predetermined water bearing parts are configured as water bearing parts of the galley water supply system being arranged upstream the water filter. Hence, ice particles in the water bearing parts being arranged upstream the water filter can be reduced, wherein the ice particles could be transported to the water filter and block it.

According to some further aspects of the galley water heating system according to the disclosure herein, the air inlet is configured as a coupling interface for fluidly connecting the fresh air piping system to a fresh air supply system of an aircraft. Preferably, the coupling interface can comprise a flow rate of fresh air flow in a range of about 1.2 liters per second (l/s) to about 1.8 l/s, in particular in a range of about 1.4 liters per second (l/s) to about 1.6 l/s. Furthermore, the coupling interface can withstand a fluid pressure inside the fresh air piping system of at least 8 mbar. Thus, the air inlet can be coupled to the fresh air supply system without redesigning the fresh air supply system of the aircraft.

According to some further aspects of the galley water heating system according to the disclosure herein, the coupling interface comprises a bifurcation element which is configured to divide a fresh air flow, wherein one branch supplies fresh air to the first air outlet and the other branch supplies fresh air to the second air outlet. Hence, the fresh air piping system can be extended with only little modifications on the existing fresh air piping system and the first air outlet, respectively, for supplying fresh air to the aircraft cabin. Therefore, the fresh air piping system may comprise two parallel pipes, wherein one pipe fluidly connects one branch of the bifurcation element with the first air outlet and wherein the other pipe fluidly connects the other branch of the bifurcation element with the second air outlet. As a result, the galley water heating system can be easily installed in service per retrofit.

The bifurcation element might also be called a fork element, a junction element or a Y-element.

According to some further aspects of the galley water heating system according to the disclosure herein, the fresh air piping system comprises a bifurcation element which is configured to divide a fresh air flow, wherein one branch supplies fresh air to the first air outlet and the other branch supplies fresh air to the second air outlet. The bifurcation element might be positioned as close as possible to the first air outlet as well as to the second air outlet such that each branch of the bifurcation element is kept to short distance. Hence, the overall length of the fresh air piping system can be reduced to a minimum. Used space and material for the galley water heating system can be reduced.

According to some further aspects of the galley water heating system according to the disclosure herein, the first air outlet is configured as an adjustable nozzle for providing an adjustable amount of fresh air to an aircraft cabin. Thus, people working in the galley working area can adjust individually the amount of fresh air released through the first air outlet to the galley working area. The adjustable nozzle can be adjusted by twisting the adjustable nozzle with fingers, for example. Thereby, the adjustable nozzle can be closed such that fresh air cannot be supplied to the galley working area/aircraft cabin.

According to some further aspects of the galley water heating system according to the disclosure herein, the predetermined water bearing parts are enclosed in a compartment of an aircraft galley which is fluidly connected to the second air outlet of the fresh air piping system. The compartment may comprise a housing, wherein a part of the housing surrounds the predetermined water bearing parts. Therefore, the housing of the compartment physically separates an inside of the compartment from an outside of the compartment, wherein the outside can be faced with a cold environment. Hence, the compartment can store a specific amount of fresh air which flows through the second air outlet for keeping the fresh air around the predetermined water bearing parts to improve the heat transfer between the water inside the predetermined water bearing parts and the fresh air.

According to some further aspects of the galley water heating system according to the disclosure herein, the fresh air piping system, the air inlet and the second air outlet are configured to have an air flow rate adapted to a predetermined amount of thermal convection needed at the predetermined water bearing parts of the galley water supply system being flowed against for keeping the water temperature above the freezing point. In particular, an inner diameter of the fresh air piping system, of the air inlet and of the second air outlet is dimensioned to provide the needed air flow rate.

The air flow rate may be dependent on the inner diameter of the fresh air piping system, of the air inlet and of the second air outlet. The air flow rate may also be dependent on an air flow velocity of the fresh air in the fresh air piping system. Further, the air flow rate may also be dependent on a temperature of the fresh air at the second air outlet.

According to some further aspects of the galley water heating system according to the disclosure herein, the fresh air piping system is fluidly connected to a trim air path having a valve for supplying the fresh air piping system with trim air having a higher temperature than fresh air, wherein the valve is configured to vary an amount of trim air flowing from the trim air path into the fresh air piping system.

Trim air, or also called hot bleed air is compressed air taken from the compressor stage of a gas turbine upstream of its fuel-burning sections. Automatic air supply and cabin pressure controller (ASCPCs) valves bleed air from high or low stage engine compressor sections. Low stage air is used during high power setting operation, and high during descent and other low power setting operations. Outside a cooling turbine of the aircraft fresh air supply system, the fresh air can be mixed with a small amount of trim air. Additionally or alternatively, the fresh air can be mixed with air discharged from the aircraft cabin, wherein the air is refreshed and recirculated. Furthermore, there can be a partial recirculation operation, in particular by a recirculation fan. Hence, the fresh air from the fresh air supply system can be heated up by the trim air since it might be too cold.

According to some aspects the aircraft galley according to the disclosure herein further comprises a compartment which encloses the predetermined water bearing parts of the galley water supply system, wherein the compartment is fluidly connected to the second air outlet. The compartment may comprise a housing, wherein a part of the housing surrounds the predetermined water bearing parts. Therefore, the housing of the compartment physically separates an inside of the compartment from an outside of the compartment, wherein the outside can be faced with a cold environment. Hence, the compartment can store a specific amount of fresh air which flows through the second air outlet for keeping the fresh air around the predetermined water bearing parts to improve the heat transfer between the water inside the predetermined water bearing parts and the fresh air.

According to some further aspects of the aircraft galley according to the disclosure herein, the compartment comprises an opening for releasing fresh air stored in the compartment. The opening can release the fresh air into the trolley compartment or to a backside of the compartment. Nevertheless, releasing the fresh air is not limited to those directions but can also comprise any other side of the compartment. As a result, a constant flow of fresh air can be provided.

According to some further aspects of the aircraft galley according to the disclosure herein, the opening of the compartment is fluidly connected to the first air outlet of the fresh air piping system. Thus, releasing fresh air into a trolley compartment can be reduced. Moreover, warming up a trolley positioned in the trolley compartment can be reduced.

According to some further aspects of the aircraft galley according to the disclosure herein, the compartment comprises a drain hole for releasing fresh air in case the pressure inside the compartment exceeds a predetermined threshold pressure. Due to the constant flow of fresh air, which is provided by the fresh air supply system of the aircraft, the pressure inside the compartment can increase in case the first air outlet is blocked since the fresh air is not able to release the fresh air piping system and/or the compartment. Thus, the drain hole in the compartment can avoid a critical pressure inside the compartment which might result in a damage or a malfunction of the galley water heating system.

BRIEF OF DESCRIPTION OF THE DRAWINGS

The disclosure herein is explained more specifically below on the basis of the example embodiments indicated in the schematic figures, in which.

DETAILED DESCRIPTION

Figure 1:
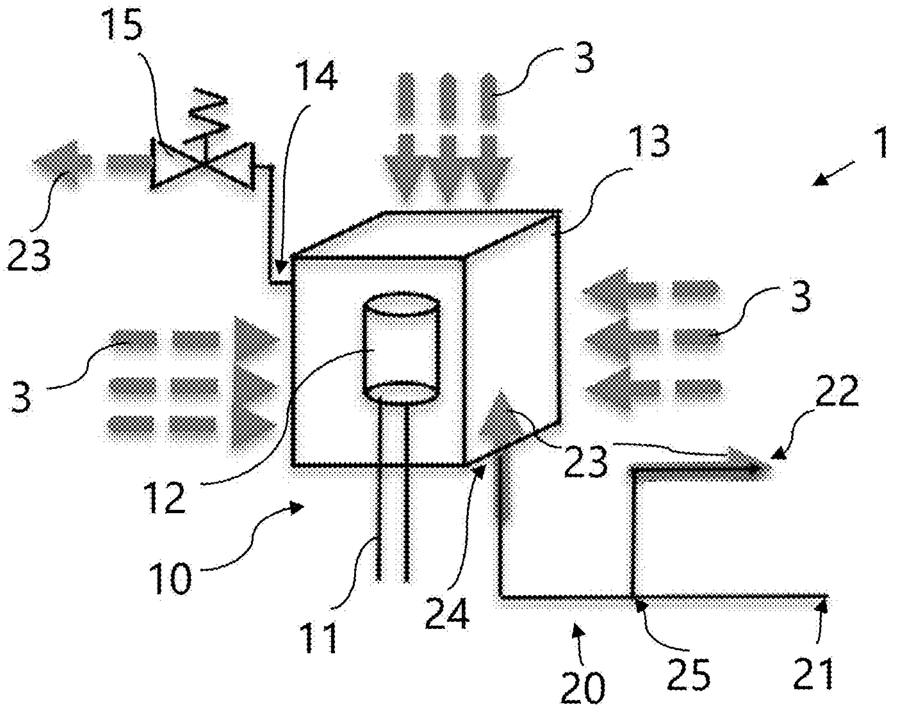
FIG. 1 shows a schematic illustration of a galley water heating system for heating the water of a water supply system of an aircraft galley according to an embodiment of the disclosure herein.

The accompanying figures are intended to convey a further understanding of the embodiments of the disclosure herein. They illustrate embodiments and are used in conjunction with the description to explain principles and concepts of the disclosure herein. Other embodiments and many of the cited advantages emerge in light of the drawings. The elements of the drawings are not necessarily shown to scale in relation to one another. Direction-indicating terminology such as for example "at the top", "at the bottom", "on the left", "on the right", "above", "below", "horizontally", "vertically", "at the front", "at the rear" and similar statements are merely used for explanatory purposes and do not serve to restrict the generality to specific configurations as shown in the figures.

In the figures of the drawing, elements, features and components that are the same, have the same function and have the same effect are each provided with the same reference signs—unless explained otherwise.

According to the disclosure herein, thermal convection is the transfer of heat from one place to another due to the movement of fluid. Thereby, thermal convection or convective heat transfer involves the combined processes of conduction (heat diffusion) and advection (heat transfer by bulk fluid flow).

Generally, an aircraft comprises a fresh air supply system for the fresh air ventilation of the aircraft cabin and/or of the cockpit. For this purpose the fresh air is obtained during flight as bleed air, or also called trim air, from the primary circuit, that means in particular the high- and intermediate-pressure compressor, of the main turbine engines and on the ground from the auxiliary turbine. On account of the high temperature level, the bleed air from the primary circuit of the main turbine engines must be precooled. This precooling takes place through bleed air from the secondary circuit of the main turbine engines which flows through a heat exchanger and as a result pre-cools the bleed air obtained from the primary circuit of the main turbine engines. An air conditioning system of the aircraft is in addition driven by the flow energy of the bleed air from the primary circuit of the main turbine engines, for example.

In other words the bleed air is let into the fresh air supply system and routed through a heat exchanger where ram air cools the bleed air. This cooled bleed air is directed into an air cycle machine. There, it is compressed before flowing through a secondary heat exchanger that cools the air again with ram air. The bleed air then flows back into the air cycle machine where it drives an expansion turbine and cools even further. Water can then be removed and the air can be mixed with bypassed bleed air for final temperature adjustment. The resulting fresh air is sent to several modules of the aircraft like the aircraft cabin and/or the cockpit through the fresh air supply system.

FIG. 1 shows a schematic illustration of a galley water heating system 1 for heating the water of a water supply system 10 of an aircraft galley 2.

The galley water heating system 1 includes the water supply system 10 which is exposed to a cold environment 3 at least on one side of the water supply system 10. The water supply system 10 comprises water bearing parts 11 and a water filter 12 for filtering the water flowing through the water bearing parts 11. Exemplarily, a compartment 13 of the aircraft galley 2 encloses the water filter 12 and a section of the water bearing parts 11. Nevertheless, the galley water heating system 1 is not limited to the water filter 12 being enclosed in the compartment 13, but the water filter 12 can also be integrated in the aircraft galley 2 without being enclosed. For example, the water filter 12 can be attached to the compartment 13 or a housing of the aircraft galley 2.

The compartment 13 can comprise a fluidly separated section which encloses the water filter 12 and sections of the water bearing parts 11, in particular the water bearing parts 11 upstream the water filter 12. The fluidly separated section of the compartment 13 may have an opening 14. For example, the opening 14 can comprise a drain hole 15 configured to release a fluid in case a pressure inside the compartment exceeds a predetermined threshold pressure. Therefore, the drain hole 15 can be configured as a pressure relief valve. Preferably, the pressure relief valve 15 is an adjustable pressure relief valve for adjusting the predetermined threshold pressure.

Alternatively or additionally, the drain hole 15 can be positioned and/or configured to block the warmer fresh air from entering a trolley compartment, but to ensure the drainage of eventual occurring water, in particular leakage in the galley water supply system and/or inside the fresh air piping system, at the same time. For example, the drain hole 15 can be configured as a bilge valve or similar kind of valve with a ball closing the outflow until enough water is collected to create enough lift force on the ball to raise it and to enable the drainage of the compartment. Preferably, the drain hole 15 can be configured as a spring-tensioned valve, but is not limited to such a configuration. It has to be taken into account that there is an overpressure inside the compartment, wherein the overpressure can be limited to the predetermined threshold pressure.

Further, the galley water heating system 1 includes a fresh air piping system 20. The fresh air piping system 20 comprises an air inlet 21, a first air outlet 22 and a second air outlet 24. Thereby, a fresh air 23 entering the fresh air piping system 20 at the air inlet 21 flows through the fresh air piping system 20. The fresh air 23 branches off at a bifurcation element 25, wherein one branch leads the fresh air 23 towards the first air outlet 22 and the other branch leads the fresh air 23 towards the second air outlet 24. The first air outlet 22 is positioned and configured to supply an aircraft cabin, in particular a galley working area, with fresh air 23, for example. The second air outlet 24 is fluidly connected to the compartment 13 for supplying the compartment 13 with fresh air 23. The fresh air 23 supplied to the compartment 13 can be basically stored inside the compartment 13 such that the fresh air 23 at least in sections surrounds the water filter 12 and/or the water bearing parts 11. Due to a constant flow of the fresh air 23 through the fresh air piping system 20 an air inside the compartment exits the compartment 13 through the opening 14, for example.

Alternatively or additionally, the fresh air piping system 20 can be routed through the compartment 13 such that a tube of the fresh air piping system 20 is routed through the compartment 13. The fresh air 23 may flow through the tube and thus through the compartment 13 without being mixed with an air inside the compartment 13. Hence, the tube of the fresh air piping system 20 can work like a heat exchanger for heating the air inside the compartment 13, for example. The tube can be used to transfer the thermal energy of the fresh air 23 into the air of the compartment 13. For transferring as much thermal energy as possible this tube may enter the compartment as low as possible and can be as long as possible. Preferably, the tube is in some kind of a helix shape to keep a downward slope. Advantageously, eventual water due to condensation of the fresh air 23 when cooling down would be kept inside the tube and would not be inside the compartment 13.

Furthermore, the fresh air piping system 20, the air inlet 21 and the second air outlet 24 can be configured to have an air flow rate adapted to a predetermined amount of thermal convection needed at the water filter 12 and/or the water bearing parts 11 being flowed against for keeping the water temperature above the freezing point.

Optionally, the fresh air piping system 20 can be coupled to a trim air path (not shown in FIG. 1). The trim air path comprises a valve for supplying the fresh air piping system 20 with trim air/bleed air having a higher temperature than fresh air 23. For example, the valve is configured to vary an amount of trim air flowing from the trim air path into the fresh air piping system 20. Therefore, the valve can be electronically controlled. In particular, the trim air path is arranged downstream the bifurcation element 25 such that only the branch supplying the second air outlet 24 and thus the compartment 13 can be additionally supplied with trim air. Hence, a temperature of the fresh air 23 flowing into the compartment 13 can be increased, in particular without affecting the fresh air 23 flowing to the aircraft cabin.

Figure 2:
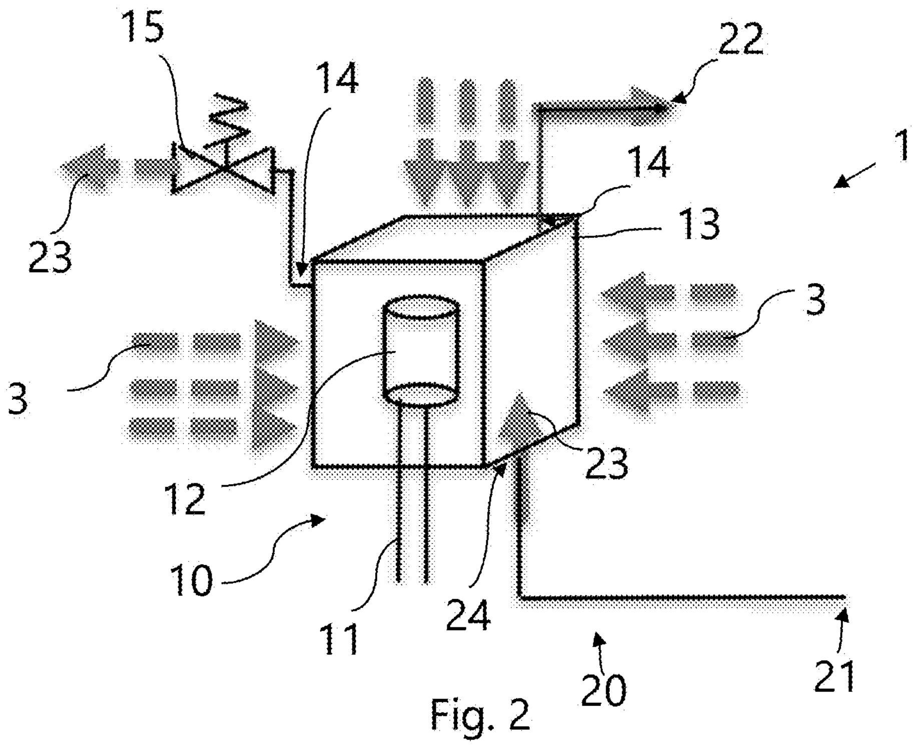
FIG. 2 shows a schematic illustration of a galley water heating system for heating the water of a water supply system of an aircraft galley according to a further embodiment of the disclosure herein.

FIG. 2 shows a schematic illustration of a galley water heating system 1 for heating the water of a water supply system 10 of an aircraft galley 2.

The galley water heating system 1 of FIG. 2 basically comprises the same features as the galley water heating system 1 according to FIG. 1. Thereby, the galley water heating system 1 according to FIG. 2 distinguishes from that of FIG. 1 in that the opening 14 is fluidly coupled to the first air outlet 22 of the fresh air piping system 20.

Thereby, a fresh air 23 entering the fresh air piping system 20 at the air inlet 21 flows through the second air outlet 24 into the compartment 13 and further through an opening 14 of the compartment 13 to the first air outlet 22. Additionally, the compartment 13 can comprise the opening 14 having the valve 15 as described in FIG. 1 for releasing fresh air 23 in case a pressure inside the compartment 13 exceeds the predetermined threshold pressure.

Normally it should be avoided to lead any fluids to an area outside the aircraft galley 2 which are not accessible or inspectable by the crew. Moreover, there can be a shut-off valve located in this area which could of course leak as well. Therefore, it might be accessible to drain water caused by a leakage inside the compartment 13 into this area in order to prevent drainage into the trolley compartment and by this it might be accessible the drain hole 15 which might lead the fresh air 23 into the trolley compartment.

Figure 3:
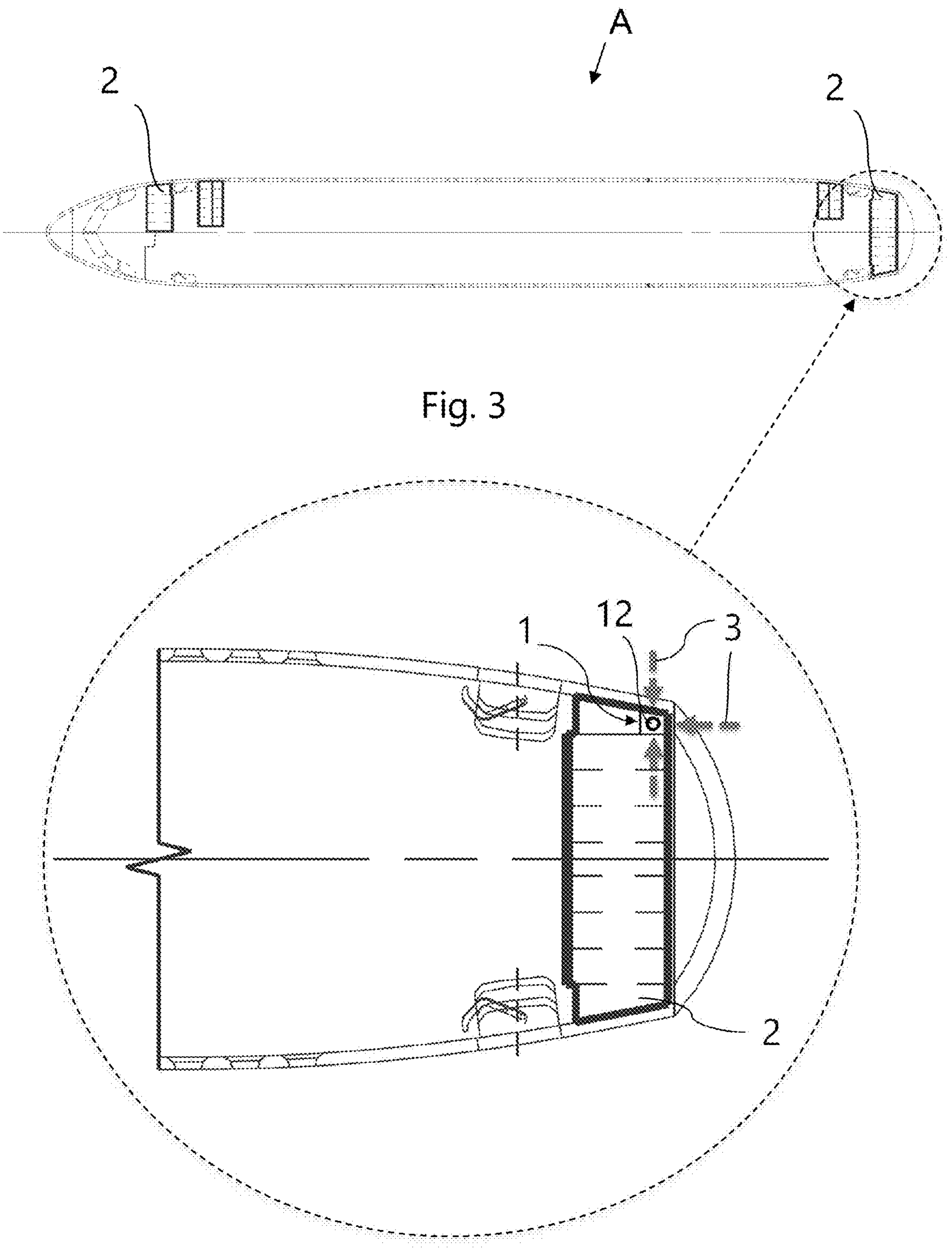
FIG. 3 shows a schematic illustration of an aircraft comprising an aircraft galley with a galley water heating system according to a further embodiment of the disclosure herein.

FIG. 3 shows a schematic illustration of an aircraft A comprising an aircraft galley 2 with a galley water heating system 1.

In FIG. 3 a plurality of aircraft galleys 2 is illustrated. In particular, one aircraft galley is located behind a cockpit of the aircraft A and one aircraft galley 2 is located in a back of a fuselage of the aircraft A. The back of the fuselage of the aircraft A is further shown in an enlarged section, which is marked with a dashed circle line.

The enlarged section of FIG. 3 shows an aircraft galley 2 comprising a galley water heating system 1 which can be configured as the galley water heating system as described in FIG. 1, as described in FIG. 2 or similar to them. The fresh air 23 supplied by the second air outlet 24 of the fresh air piping system 20 may provide a thermal energy to the predetermined water bearing parts 12, in particular to the water filter and/or to the water bearing parts being arranged upstream the water filter, of the galley water supply system 10 by thermal convection on a surface of the galley water supply system 10.

Optionally, the aircraft galley 2 further comprises a compartment 13 which encloses the predetermined water bearing parts 12 of the galley water supply system 10.

In particular, a cold environment 3 is present at a corner area of the aircraft galley 2 since the corner area might be next to an outer structure of the aircraft A.

In the detailed description above, various features have been combined in one or more examples in order to improve the rigorousness of the illustration. However, it should be clear in this case that the above description is of merely illustrative but in no way restrictive nature. It serves to cover all alternatives, modifications and equivalents of the various features and example embodiments. Many other examples will be immediately and directly clear to a person skilled in the art on the basis of his knowledge in the art in consideration of the above description.

The example embodiments have been chosen and described in order to be able to present the principles underlying the disclosure herein and their application possibilities in practice in the best possible way. As a result, those skilled in the art can optimally modify and utilize the disclosure herein and its various exemplary embodiments with regard to the intended purpose of use. In the claims and the description, the terms “including” and “having” are used as neutral linguistic concepts for the corresponding terms “comprising”. Furthermore, use of the terms “a”, “an” and “one” shall not in principle exclude the plurality of features and components described in this way.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms “comprise” or “comprising” do not exclude other elements or steps, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST

1 galley water heating system
2 aircraft galley
3 cold environment
10 galley water supplying system
11 water bearing parts
12 predetermined water bearing parts
13 compartment
14 opening

15 drain hole
20 fresh air piping system
21 air inlet
22 first air outlet
23 fresh air
24 second air outlet
25 bifurcation element
A aircraft

The invention claimed is:

1. A galley water heating system, comprising:

a galley water supply system of an aircraft galley, wherein:

the galley water heating system is configured to heat the galley water supply system; and the galley water heating system comprises water bearing parts;

a fresh air piping system comprising:

an air inlet located at one end of the fresh air piping system;

a first air outlet for supplying fresh air to an aircraft cabin, wherein the first air outlet is located at another end of the fresh air piping system; and a second air outlet located in relation to the galley water supply system, such that fresh air can flow at least in sections against predetermined water bearing parts of the water bearing parts.

2. The galley water heating system according to claim 1, wherein the predetermined water bearing parts comprise a water filter of the galley water supply system and/or as a subset of the water bearing parts arranged upstream of the water filter.

3. The galley water heating system according to claim 1, wherein the air inlet comprises a coupling interface for fluidly connecting the fresh air piping system to a fresh air supply system of an aircraft.

4. The galley water heating system according to claim 3, wherein the coupling interface comprises a bifurcation element configured to divide a flow of fresh air within the fresh air piping system into at least a first branch and a second branch, wherein the first branch supplies a portion of the fresh air to the first air outlet and the second branch supplies a further portion of the fresh air to the second air outlet.

5. The galley water heating system according to claim 1, wherein the fresh air piping system comprises a bifurcation element configured to divide a flow of fresh air within the fresh air piping system into at least a first branch and a second branch, wherein the first branch supplies a portion of the fresh air to the first air outlet and the second branch supplies a further portion of the fresh air to the second air outlet.

6. The galley water heating system according to claim 1, wherein the first air outlet comprises an adjustable nozzle for providing an adjustable amount of the fresh air to an aircraft cabin.

7. The galley water heating system according to claim 1, wherein the predetermined water bearing parts are enclosed in a compartment of an aircraft galley which is fluidly connected to the second air outlet of the fresh air piping system, such that the fresh air from the second air outlet is exhausted into the compartment.

8. The galley water heating system according to claim 1, wherein the fresh air piping system, the air inlet, and the second air outlet are configured to have an air flow rate adapted to a predetermined amount of thermal convection needed at the predetermined water bearing parts for maintaining a temperature of water within the predetermined water bearing parts above a freezing point of the water.

9. The galley water heating system according to claim 1, wherein:

the fresh air piping system is fluidly connected to a trim air path;

the trim air path comprises a valve for supplying the fresh air piping system with trim air;

the trim air has a temperature that is higher than a temperature of the fresh air; and the valve is configured to control an amount of the trim air flowing from the trim air path into the fresh air piping system.

10. An aircraft galley comprising the galley water heating system according to claim 1, wherein the fresh air supplied by the second air outlet provides a thermal energy to the predetermined water bearing parts by thermal convection.

11. The aircraft galley according to claim 10, further comprising a compartment which encloses the predetermined water bearing parts of the galley water supply system, wherein the compartment is fluidly connected to the second air outlet, such that the fresh air from the second air outlet exhausts into the compartment.

12. The aircraft galley according to claim 11, wherein the compartment comprises an opening for releasing the fresh air from the compartment.

13. The aircraft galley according to claim 12, wherein the first air outlet is fluidly connected to the opening of the compartment, such that the fresh air supplied to the aircraft cabin by the first air outlet first passes through the compartment.

14. The aircraft galley according to claim 11, wherein the compartment comprises a drain hole for releasing fresh air when a pressure inside the compartment exceeds a predetermined threshold for the pressure.

15. An aircraft with the aircraft galley according to claim 10.

* * * * *